Patented Sept. 6, 1938

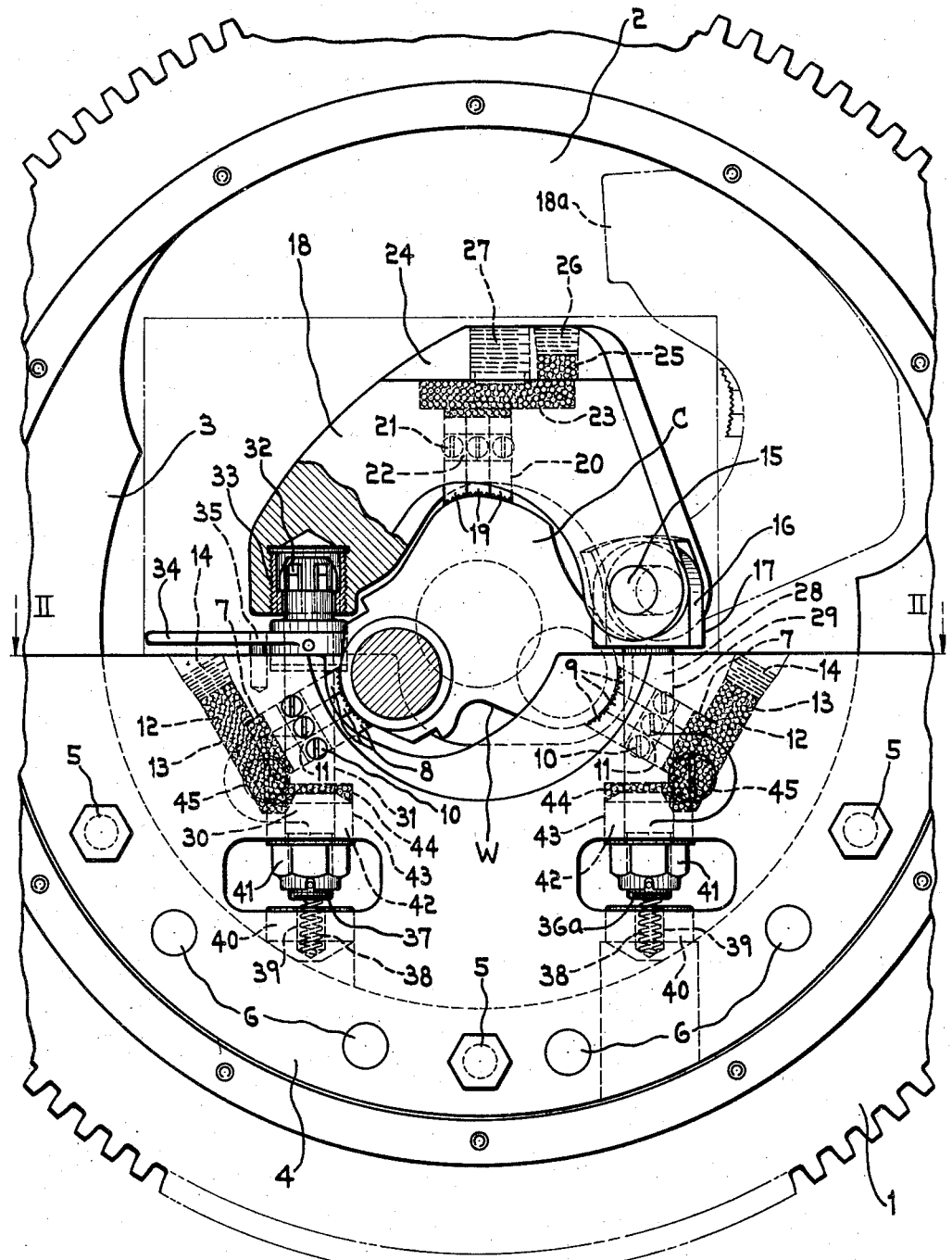
FIG. I
INVENTORS.
WILLIAM F. GROENE
WALTER R. MEYER
ATTORNEY.

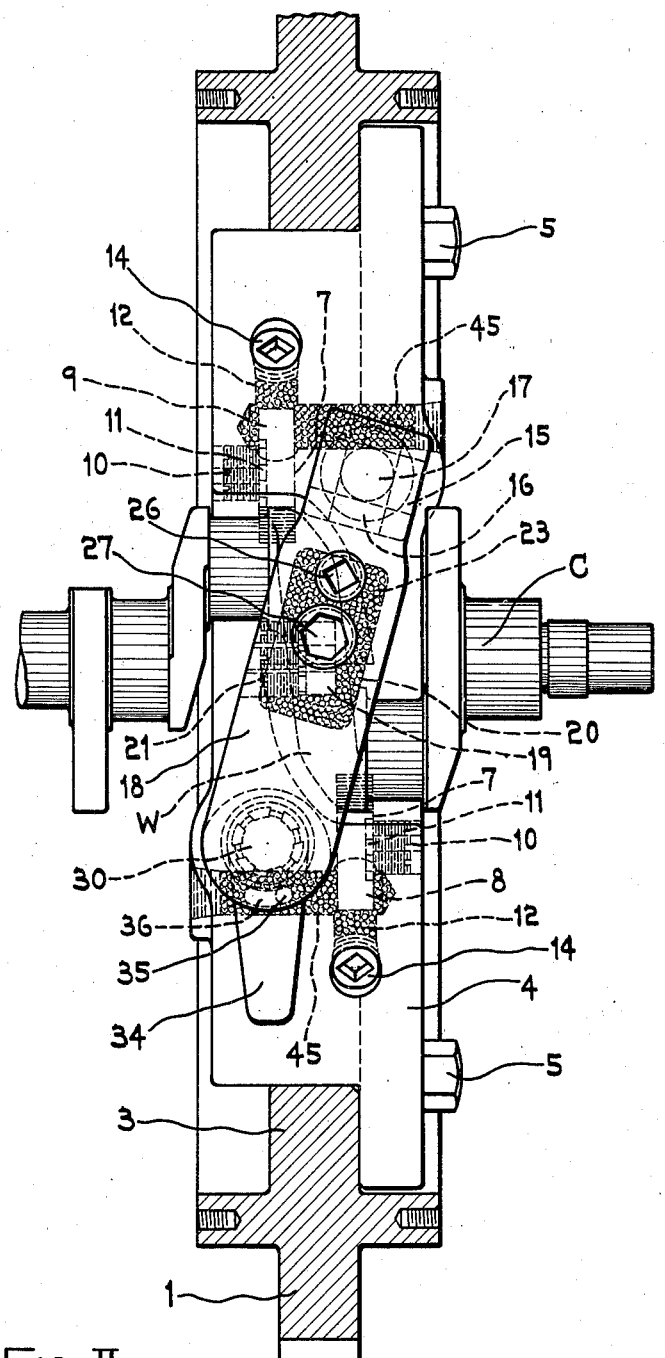

2,129,271

UNITED STATES PATENT OFFICE 2,129,271

CRANKSHAFT CHUCK

William F. Groene and Walter R. Meyer, Cincinnati, Ohio, assignors to The R. K. Le Blond Machine Tool Company, Cincinnati, Ohio, a corporation of Delaware Application October 6, 1937, Serial No. 167,613

8 Claims. (Cl. 82—40)

This invention pertains to chucks for gripping irregular rough-surfaced work pieces which have been properly prelocated with respect to the axis of rotation of the chuck. More particularly this invention pertains to chucks for gripping the rough surfaces of webs of crankshafts to be chucked and rotated in a crankshaft lathe, for instance, of a character shown in Patent Number 2,069,107 issued January 26, 1937.

The chief object of our invention is to provide a chuck which is adapted to engage a pre-centered and pre-indexed work piece in a lathe by means of rough irregular surfaces thereof in such a way as to securely support, locate, and drive said work piece while maintaining it at all times in its proper prelocated position.

Our invention further involves certain improvements in chucking devices of a character set forth in applications Serial No. 132,506 filed March 23, 1937; Serial No. 136,634 filed April 13, 1937; and Serial No. 138,205 filed April 21, 1937.

An object of our invention is to provide in a chuck certain series of movable work gripping compensating plungers mounted in the chuck body and to have a clamp containing work gripping plungers, the clamp being bodily movable relative to the work piece to be gripped during the final tightening of the chuck on the work.

And still another object is to provide a chuck having work gripping compensating plungers in the chuck body to one side of the axis of rotation of the chuck and to provide a swinging clamp with compensating plungers at the other side of said axis, the clamp being pivotally mounted and latched in work gripping position by mechanism which permits relative movement of the clamp and the work piece in accordance with the movements of the compensating plungers as they engage the work piece.

Further objects will appear from a description of the drawings, in which:

Figure I is an axial view of a center drive ring gear chuck embodying the features of this invention.

Figure II is a transverse section on the line II—II through the chuck of Figure I.

As an exemplary disclosure we show our invention applied to a ring gear 1 of a center drive work spindle having an axial bore 2 through which may be axially loaded a work piece or crankshaft C into or out of the ring gear 1.

To the inner rib 3 formed integral with the ring gear 1 is fixed the frame 4 by suitable screws 5 and dowel pins 6. Slidably mounted in appropriate slots 7 are two series of compensating plungers 8 and 9 adapted to move substantially radially of the axis of rotation of the chuck. Retaining screws 10 threaded in the frame 4 and entering the slots 11 in each of the plungers 8 and 9 serve to retain them in the frame 4 while at the same time providing ample freedom of movement of the plungers to allow their outer ends to properly engage the rough irregular surfaces of the periphery of the web W of a crankshaft C. Behind the plungers 8 and 9 are chambers formed by the slots and the passageways 12 into which the slots open containing a compensating pressure receiving medium such as a hydraulic fluid, a semi-liquid, or metallic balls or shot 13 as shown in this examplary embodiment, the upper ends (Fig. I) of the passageway 12 being closed by pipe plugs 14.

On the pin 15 fixed in the head 16 of an eyebolt 17 is pivotally mounted the clamp 18 which has the series of compensating plungers 19 slidably mounted in a suitable slot 20 formed in the clamp for movement substantially radially of the axis of rotation of the chuck. Retaining screws 21 threaded in the clamp 18 and entering the slots 22 in each of the plungers 19 serve to retain them in the clamp 18 while at the same time providing ample freedom of movement of the plungers to allow their ends to properly engage the web W. A chamber is formed behind these plungers 19 by the slot 20 and the cavity 23 in the clamp 18. A plate 24 is welded over the cavity 23 to complete the chamber behind the plungers which contains a compensating pressure receiving medium 13 similar to that utilized in the chambers behind the plungers 8 and 9. In that plate 24 is provided a passageway 25 for insertion of the medium in the cavity 23 the passageway being normally closed by the pipe plug 26. Also threaded in the plate 24 is the clamp screw 27 which projects into the cavity 23 and engages the medium therein so that when the screw 27 is screwed down against the medium the plungers 19 will be thrust outwardly (or downwardly in Figure I) to force them in engagement with the web W of the crankshaft C. The eyebolt 17 is pivotally and slidably mounted on its stem 28 in a suitable bore 29 formed in the frame 4 so that pivot pin 15 and the clamp may have movement up and down as shown in Fig. I. The pivotal mounting of the eyebolt also permits sidewise swinging of clamp 18 to facilitate loading and unloading work in the chuck.

The clamp 18 is held in position when swung over the work by a latch comprising a latch bolt 30 which is pivotally and slidably mounted in a suitable bore 31 formed in the frame 4. The upper end of the bolt 30 is provided with an enlarged splined end 32 which enters a female splined socket 33 fixed in the clamp 18 when the clamp is swung over the work. When the bolt is rotated partially the proper amount, the splined end 32 will not pass back through the splined portion 33 because these portions under these conditions are not aligned. The clamp will thus be held from swinging upward away from the work C when the clamping screw 27 is tightened. A suitable operating handle 34 fixed on the bolt 30 is provided for rotating it to clamping or unclamping position, a pin 35 fixed in the handle 34 and operating in a slot 36 in the frame 4 serving to locate these positions for the handle and bolt 30.

The lower end 36a of the stem 28 of the eyebolt 17 and the lower end 37 of the latch bolt 30 are each supported on compression coil springs 38 mounted in bores 39 in plugs 40 fixed in the frame 4 the purpose of which arrangement is to yieldingly upwardly urge the clamp 18 when swung over the work to prevent the clamp 18 resting on the crankshaft C in order not to deflect the crankshaft downwardly from true prelocated position during the clamping of the work in the chuck.

Mounted adjacent these downward extensions of the eyebolt 17 and latch bolt are lock nuts 41 which support abutment collars 42 adapted to slide freely in the counterbores 43 formed in the frame 4 when the eyebolt and latch bolt are moved up and down. Above the collars 42 are provided chambers 44 by the counterbores 43 which are interconnected with the passageways 12 by passageways 45 so that the medium in the chamber behind the plungers 8 and 9 may enter or be expelled from the chambers 44 as the collars 42 are moved up and down. Thus when the eyebolt 17 is moved upward the medium in chamber 44 associated therewith will be expelled into the chamber formed behind plungers 9 and cause them to move toward the work C. Likewise when the latch bolt 30 is raised the plungers 8 will be forced toward the work C.

In operating the chuck the clamp 18 is swung back away from the work to a position indicated at 18a so the work C may be easily passed into the chuck. The work C is then located in proper centered and indexed position in the lathe by means other than the chuck such as the tailstocks center pins of the lathe. The clamp 18 is then swung down over the work and the lever 34 moved to latch the clamp in this position. Under these conditions the weight of the clamp is supported on the springs 38 so that it does not rest on the work piece C. The plungers 19 do, however, rest lightly against the web W. The collars 42 are in their downward position so that the plungers 8 and 9 are slightly withdrawn from the work or are free to be moved backward from the work when the work is placed in the lathe.

The clamp screw 27 is then firmly tightened down which forces the plungers 19 toward the work which causes the clamp 18 to be raised with the assistance of the springs 38. This movement also raises the eyebolt and latch bolt which in turn causes the plungers 8 and 9 to move toward and engage the web W of the crankshaft C. Final tightening of the clamp screw 27 will thus cause all of the plungers 8, 9, and 19 to engage the work with equal pressure through the equalizing and interlocking mechanism here set forth.

Having fully set forth and described our invention, what we claim as new and desire to secure by United States Letters Patent is:

1. In a chuck, a rotatable chuck body, work engaging plungers mounted in said chuck body to one side of the axis of rotation of said chuck, chambers containing a compensating pressure receiving medium behind said plungers, a clamp pivotally mounted on the other side of said axis, a latch means associated with said clamp, work engaging plungers mounted in said clamp, a chamber containing a compensating pressure receiving medium behind said last mentioned plungers, said pivotal mounting and said latch means associated with said clamp being floatingly mounted on said chuck body and interconnected with said first mentioned chambers, and means in said clamp for applying pressure to said second mentioned chamber.

2. In a chuck, a rotatable chuck body, a plurality of series of angularly related work engaging plungers mounted in said chuck body to one side of the axis of rotation of said chuck, chambers containing a compensating pressure receiving medium behind said plungers, a clamp pivotally mounted on the other side of said axis, a latch means associated with said clamp, work engaging plungers mounted in said clamp, and a chamber containing a compensating pressure receiving medium behind said last mentioned plungers, said pivotal mounting and said latch means associated with said clamp being floatingly mounted on said chuck body, the pivotal mounting being interconnected with some of said first mentioned chambers and said latch means being interconnected with other of said first mentioned chambers, and means in said clamp for applying pressure to said second mentioned chamber.

3. In a chuck, a rotatable chuck body, work engaging plungers mounted in said chuck body to one side of the axis of rotation of said chuck, chambers containing a compensating pressure receiving medium behind said plungers, a clamp pivotally mounted on the other side of said axis, a latch means associated with said clamp, work engaging plungers mounted in said clamp, a chamber containing a compensating pressure receiving medium behind said last mentioned plungers, said pivotal mounting and said latch means associated with said clamp being movable relative to said chuck body, resilient means associated with said pivotal mounting and said latch means for yieldingly supporting said clamp when in work engaging position, and means in said clamp for applying pressure to said second mentioned chamber.

4. In a chuck, a rotatable chuck body, a frame fixed to said body, a pair of series of angularly related compensating work engaging plungers mounted in said frame, chambers in said frame behind said plungers, a clamp movably mounted on a pivot and a latch relative to said frame, pressure receiving abutments on said pivot and latch, chambers in said frame behind said abutments, a compensating pressure receiving medium in all of said chambers, and interconnecting means between said first mentioned and said second mentioned chambers to permit free flow of said medium between said chambers in accordance with the movements of said clamp and said plungers.

5. In a chuck, a rotatable chuck body, a frame fixed to said body, a pair of series of angularly related compensating work engaging plungers mounted in said frame, a chamber in said frame behind each of said series of plungers, a clamp movably mounted on a pivot and a latch relative to said frame, a pressure receiving abutment on said pivot and on said latch, a chamber in said frame behind each of said abutments, a compensating pressure receiving medium in all of said chambers, and interconnecting means between one of said first mentioned chambers and one of said second mentioned chambers and between the other of said first mentioned chambers and the other of said second mentioned chambers to permit free flow of said medium between said chambers in accordance with the movements of said clamp and said plungers.

6. In a chuck, a rotatable chuck body, a frame fixed to said body, a pair of series of angularly related compensating work engaging plungers mounted in said frame, chambers in said frame behind said plungers, a clamp movably mounted on a pivot and a latch relative to said frame, pressure receiving abutments on said pivot and latch, chambers in said frame behind said abutments, a compensating pressure receiving medium in all of said chambers, interconnecting means between said first mentioned and said second mentioned chambers to permit free flow of said medium between said chambers, and resilient means mounted in said frame and associated with said pivot and said latch for normally urging said clamp away from said compensating plungers.

7. In a chuck, a rotatable chuck body, a frame fixed to said body, compensating work engaging plungers mounted in said frame, chambers in said frame behind said plungers, a clamp pivotally mounted on an eyebolt which is pivotally and slidably mounted in said frame, said clamp being adapted to be swung over a work piece in the chuck or to be swung back away from said work piece for unloading said chuck, a latch movably mounted in said frame for holding said clamp in position when swung over said work piece, means for engaging and disengaging said latch from said clamp, means engaging said work piece tending to force said clamp away from said compensating plungers when the chuck is being applied to the work, and means interconnecting said eyebolt and said latch with said compensating plungers whereby the movement of said clamp is defined by the movement of said compensating plungers.

8. In a chuck, a rotatable chuck body, means to one side of the axis of said chuck to engage a prelocated work piece by means of rough, irregular surfaces thereof, a clamp on said chuck body to the other side of said axis from said work engaging means and bodily movable relative thereto, means movable in said clamp for engaging said work piece, and interconnecting means between said clamp and said first mentioned work engaging means to limit the bodily movement of said clamp when said work engaging means in said clamp is moved against said work piece.

WILLIAM F. GROENE.
WALTER R. MEYER.